(12) United States Patent
Song et al.

(10) Patent No.: US 9,846,333 B2
(45) Date of Patent: Dec. 19, 2017

(54) MANUFACTURING METHOD OF LIQUID CRYSTAL PANEL

(71) Applicant: SHENZHEN CHINA STAR OPTOELECTRONICS TECHNOLOGY CO., LTD., Shenzhen, Guangdong (CN)

(72) Inventors: Yanjun Song, Guangdong (CN); Chungching Hsieh, Guangdong (CN); Yongchao Zhao, Guangdong (CN); Xiang Li, Guangdong (CN)

(73) Assignee: Shenzhen China Star OptoElectronics Technology Co., Ltd., Shenzhen, Guangdong (CN)

( * ) Notice: Subject to any disclaimer, the term of this patent is extended or adjusted under 35 U.S.C. 154(b) by 229 days.

(21) Appl. No.: 14/895,655

(22) PCT Filed: Sep. 17, 2015

(86) PCT No.: PCT/CN2015/089860
§ 371 (c)(1),
(2) Date: Dec. 3, 2015

(87) PCT Pub. No.: WO2017/035873
PCT Pub. Date: Mar. 9, 2017

(65) Prior Publication Data
US 2017/0255063 A1    Sep. 7, 2017

(30) Foreign Application Priority Data

Sep. 1, 2015  (CN) .......................... 2015 1 0551234

(51) Int. Cl.
*G02F 1/1337*  (2006.01)
*G02F 1/1335*  (2006.01)
(Continued)

(52) U.S. Cl.
CPC ...... *G02F 1/133788* (2013.01); *G02F 1/1339* (2013.01); *G02F 1/133514* (2013.01);
(Continued)

(58) Field of Classification Search
CPC ......... G02F 1/133788; G02F 1/133514; G02F 1/13378; G02F 1/133753; G02F 1/1339
See application file for complete search history.

(56) References Cited

U.S. PATENT DOCUMENTS 9,207,504 B2 * 12/2015 Kimura ............ G02F 1/134363
2006/0061722 A1 * 3/2006 Jun ................. G02F 1/133707
349/139
2011/0102720 A1 * 5/2011 Mizusaki ............... C08F 20/00
349/123

* cited by examiner

*Primary Examiner* — Anne Hines
(74) *Attorney, Agent, or Firm* — Kirton McConkie; Evan R. Witt

(57) ABSTRACT

A manufacturing method of a liquid crystal panel is provided with steps of: providing an array substrate having a first electrode with a plurality of slots and a second electrode thereon, and a color filter substrate; applying a first photo alignment film to the array substrate, and performing a first irradiation treatment on the first photo alignment film to have a first pretilt angle; applying a second photo alignment film to the color filter substrate, and performing a second irradiation treatment on the second photo alignment film to have a second pretilt angle antiparallel to the first pretilt angle; sealing a liquid crystal molecule and a photopolymerizable monomer within a space between the first photo alignment film and the second photo alignment film to form a liquid crystal panel; and performing a third irradiation treatment on the liquid crystal panel to carry out a polymerization of the photopolymerizable monomer.

15 Claims, 5 Drawing Sheets

(51) Int. Cl.
*G02F 1/1339* (2006.01)
*G02F 1/1343* (2006.01)

(52) U.S. Cl.
CPC .. *G02F 1/133753* (2013.01); *G02F 1/134363* (2013.01); *G02F 2001/133761* (2013.01); *G02F 2001/134372* (2013.01)

MANUFACTURING METHOD OF LIQUID CRYSTAL PANEL

CROSS REFERENCE TO RELATED APPLICATIONS

This application is a U.S. National Phase application submitted under 35 U.S.C. §371 of Patent Cooperation Treaty Application serial No. PCT/CN2015/089860, filed on Sep. 17, 2015, which claims the priority of China Patent Application serial No. 201510551234.X, filed on Sep. 1, 2015, the disclosures of which are incorporated herein by reference.

FIELD OF THE INVENTION

The present invention relates to a manufacturing method of a liquid crystal panel, and more particularly to a manufacturing method of an IPS (In-Plane Switch) liquid crystal panel or a FFS (Fringe Field Switching) liquid crystal panel with wide viewing angles.

BACKGROUND OF THE INVENTION

Currently, in a variety of display technologies, liquid crystal display has been widely accepted as a mature technology. Liquid crystal display (LCD) uses the electro-optic effect of the liquid crystal, and the intensity of the light transmitted through the color resistance from a backlight module is adjusted by controlling the transmittance and reflectance of the liquid crystal molecules through a circuit to achieve different gray levels and different color displays.

The traditional vertical alignment (VA) display technology has the advantages of high contrast, high transmittance, and quick response, but it has poor viewing angles that need a plurality of domains to solve the problem of color wash out. However, the traditional IPS/FFS display technology has the advantage of wide viewing angles, but it has poor contrast compared with the VA display technology.

It is therefore necessary to provide a liquid crystal panel having the above advantages of the two display technologies to solve the problems existing in the conventional technology as described above.

SUMMARY OF THE INVENTION

A primary object of the present invention is to provide a manufacturing method of a liquid crystal panel having advantages of Polymer Stabilization Vertical Alignment (PSVA) and IPS/FFS, which has low dark-state and quick response with pretilt angles, in order to effectively improve the contrast of IPS/FFS and obtain a display with high penetration and wide viewing angles. Furthermore, the polymerization of the chemical monomers can be used for increasing the interaction between a liquid crystal and an alignment film to benefit the improvement of image sticking, and further promote the reliability of the liquid crystal panel.

To achieve the above object, the present invention provides a manufacturing method of a liquid crystal panel, comprising steps of: providing an array substrate and a color filter substrate, wherein the array substrate comprises a first electrode and a second electrode, and the first electrode has a plurality of slots; applying a first photo alignment film to the array substrate, and performing a first irradiation(illumination) treatment on the first photo alignment film so that the first photo alignment film has a first pretilt angle relative to the array substrate; applying a second photo alignment film to the color filter substrate, and performing a second irradiation treatment on the second photo alignment film so that the second photo alignment film has a second pretilt angle relative to the color filter substrate; sealing a liquid crystal molecule and a photopolymerizable monomer within a space between the first photo alignment film and the second photo alignment film to form a liquid crystal panel; and performing a third irradiation treatment on the liquid crystal panel so as to carry out a polymerization of the photopolymerizable monomer; wherein the slots comprise a first extending direction and a second extending direction; the first extending direction and the second extending direction respectively correspond to a first domain and a second domain; and the second pretilt angle is antiparallel to the first pretilt angle; and wherein when the liquid crystal molecule is a positive liquid crystal, the first pretilt angle has an azimuthal angle relative to an extending direction of the slots; when the liquid crystal molecule is a negative liquid crystal, the first pretilt angle has an azimuthal angle relative to a vertical direction of the slots.

Furthermore, to achieve the above object, another embodiment of the present invention provides a manufacturing method of a liquid crystal panel, comprising steps of: providing an array substrate and a color filter substrate, wherein the array substrate comprises a first electrode and a second electrode, and the first electrode has a plurality of slots; applying a first photo alignment film to the array substrate, and performing a first irradiation treatment on the first photo alignment film so that the first photo alignment film has a first pretilt angle relative to the array substrate; applying a second photo alignment film to the color filter substrate, and performing a second irradiation treatment on the second photo alignment film so that the second photo alignment film has a second pretilt angle relative to the color filter substrate; sealing a liquid crystal molecule and a photopolymerizable monomer within a space between the first photo alignment film and the second photo alignment film to form a liquid crystal panel; and performing a third irradiation treatment on the liquid crystal panel so as to carry out a polymerization of the photopolymerizable monomer; wherein the second pretilt angle is antiparallel to the first pretilt angle.

In one embodiment of the present invention, when the liquid crystal molecule is a positive liquid crystal, the first pretilt angle has an azimuthal angle relative to an extending direction of the slots.

In one embodiment of the present invention, when the liquid crystal molecule is a negative liquid crystal, the first pretilt angle has an azimuthal angle relative to a vertical direction of the slots.

In one embodiment of the present invention, the azimuthal angle is between 0 and 45 degrees.

In one embodiment of the present invention, the first irradiation treatment is carried out by a zoning irradiation so that an upper portion of the first photo alignment film and a lower portion of the first photo alignment film have the first pretilt angle and a third pretilt angle relative to the array substrate respectively.

In one embodiment of the present invention, the second irradiation treatment is carried out by a zoning irradiation so that an upper portion of the second photo alignment film and a lower portion of the second photo alignment film have the second pretilt angle and a fourth pretilt angle relative to the color filter substrate respectively.

In one embodiment of the present invention, the third pretilt angle is antiparallel to the fourth pretilt angle.

In one embodiment of the present invention, after the third irradiation treatment, the manufacturing method further comprises a step of: conducting the first electrode and the second electrode to produce an electric field, so that a longitudinal axis of the liquid crystal molecule rotates to parallel the array substrate and the color filter substrate.

The abovementioned features adopted by the present invention to achieve the above and other objects can be best understood by referring to the following detailed description of the preferred embodiments and the accompanying drawings.

DESCRIPTION OF THE DRAWINGS

FIG. 2A is for a positive liquid crystal, and FIG. 2B is for a negative liquid crystal.

DETAILED DESCRIPTION OF THE PREFERRED EMBODIMENTS

The detailed description of the following embodiments is used for exemplifying the specific embodiments of the present invention by referring to the accompany drawings. Furthermore, directional terms described by the present invention, such as upper, lower, front, back, left, right, inner, outer, side, etc., are only directions by referring to the accompanying drawings, and thus the directional terms are used to describe and understand the present invention, but the present invention is not limited thereto.

Figure 1A:
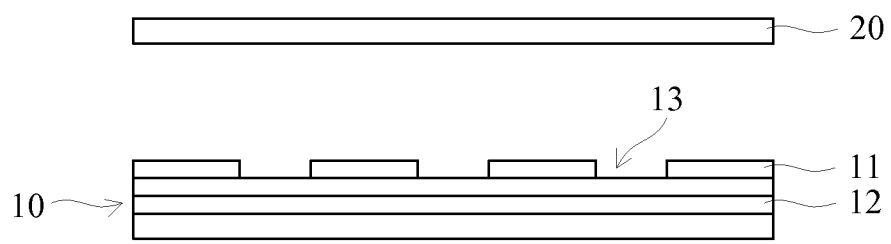
FIGS. 1A to 1F are schematic views of a manufacturing method of a liquid crystal panel according to one embodiment of the present invention.

Referring to FIGS. 1A to 1F, showing a manufacturing method of a liquid crystal panel according to one embodiment of the present invention. First, as shown in FIG. 1A, a manufacturing method of a liquid crystal panel is to execute a step (1) of: providing an array substrate 10 and a color filter substrate 20. The array substrate 10 has a first electrode 11 and a second electrode 12 thereon, the first electrode 11 can be provided with a plurality of slots 13, for example, an indium tin oxide (ITO) electrode having a plurality of parallel slots.

Figure 1B:
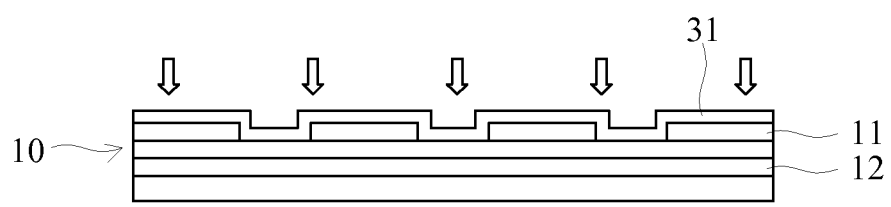

Next, referring to FIG. 1B, a manufacturing method of a liquid crystal panel is to execute a step (2) of: applying a first photo alignment film 31 to the array substrate 10, and performing a first irradiation (illumination) treatment on the first photo alignment film 31. Preferably, the first photo alignment film 31 faces upwards and then the first irradiation treatment is performed. The first irradiation treatment can be carried out on the first photo alignment film 31 and the array substrate 10 by using a UV light irradiation. Therefore, the first photo alignment film 31 has a first pretilt angle relative to the array substrate 10.

Figure 1C:
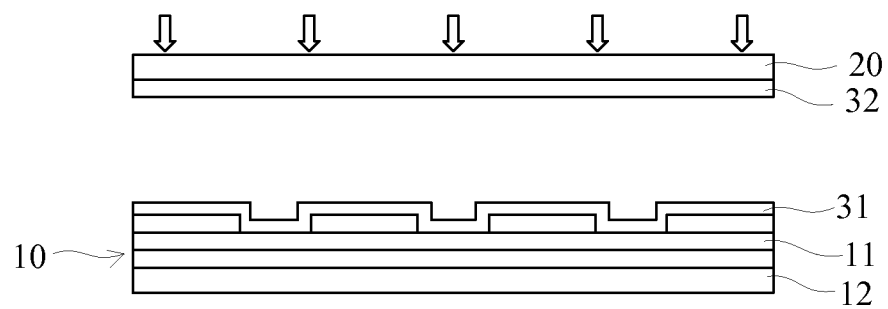

Next, referring to FIG. 1C, a manufacturing method of a liquid crystal panel is to execute a step (3) of: applying a second photo alignment film 32 to the color filter substrate 20, and performing a second irradiation treatment on the second photo alignment film 32. The second irradiation treatment can be carried out on the second photo alignment film 32 and the array substrate 20 by using an UV light irradiation. Therefore, the second photo alignment film 32 has a second pretilt angle relative to the array substrate 20. Preferably, the second pretilt angle formed by the second irradiation treatment is antiparallel to the first pretilt angle formed by the first irradiation treatment. The term "antiparallel" hereafter means that two lines (such as the photo alignment polymers at two sides) are parallel to each other, but they have opposite directions (for example, the direction from the head terminal to the end terminal of the photo alignment polymers at two sides is opposite).

Figure 1D:
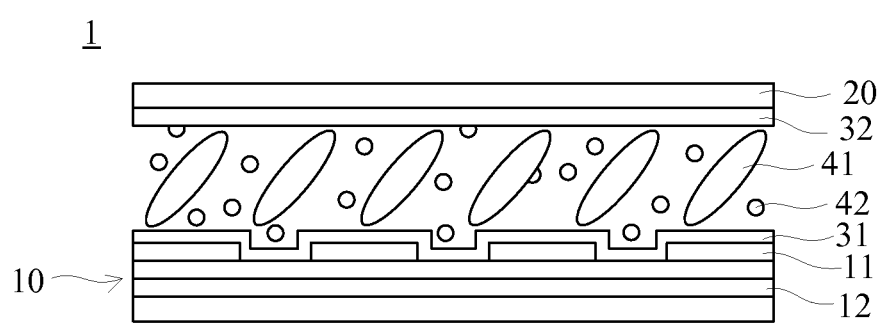

Next, referring to FIG. 1D, a manufacturing method of a liquid crystal panel is to execute a step (4) of: sealing a liquid crystal molecule 41 and a photopolymerizable monomer 42 within a space between the first photo alignment film 31 and the second photo alignment film 32 to form a liquid crystal panel 1. The liquid crystal molecule 41 is, for example, a positive liquid crystal or a negative liquid crystal. The photopolymerizable monomer 42 is for example a monomer which can be polymerizable under a UV irradiation.

Figure 1E:
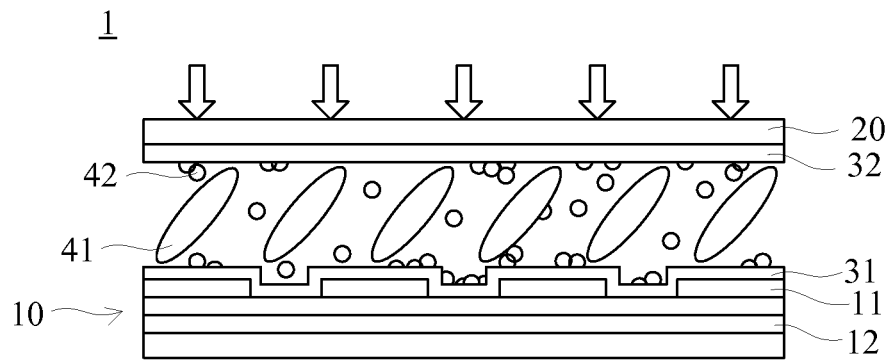

Next, referring to FIG. 1E, a manufacturing method of a liquid crystal panel is to execute a step (5) of: performing a third irradiation treatment on the liquid crystal panel 1 so as to carry out a polymerization of the photopolymerizable monomer 42. In this step, the photopolymerizable monomer 42 can be polymerized with the first photo alignment film 31 and the second photo alignment film 32 to form bump-like structures on both of their surfaces, so that the liquid crystal molecule 41 has the first pretilt angle and the second pretilt angle. Since the liquid crystal molecule 41 has the first pretilt angle and the second pretilt angle, the quick response can be achieved. In addition, in this step, the liquid crystal 41 nearly forms a vertical alignment by the first pretilt angle and the second pretilt angle.

Figure 1F:
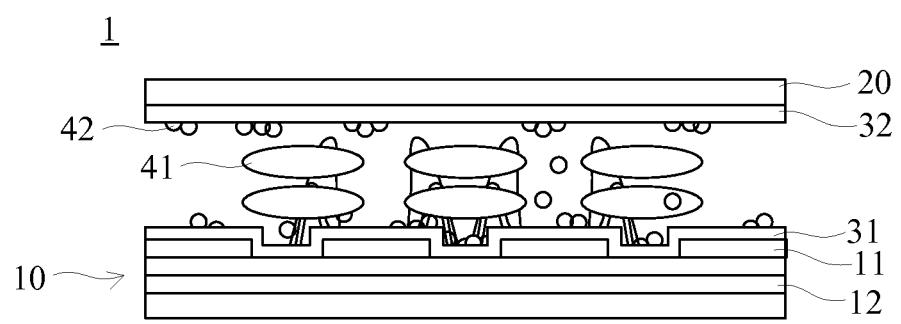

Next, referring to FIG. 1F, a manufacturing method of a liquid crystal panel is to execute a step (6) of: conducting the first electrode 11 and the second electrode 12 to produce an electric field. A longitudinal axis of the liquid crystal molecule 41 can be rotated by the electric field to parallel the array substrate 10 and the color filter substrate 20, thereby obtaining an IPS or a FFS display mode.

The abovementioned step (2) and (3) of the manufacturing method of a liquid crystal panel are exchangeable.

Figure 2A:
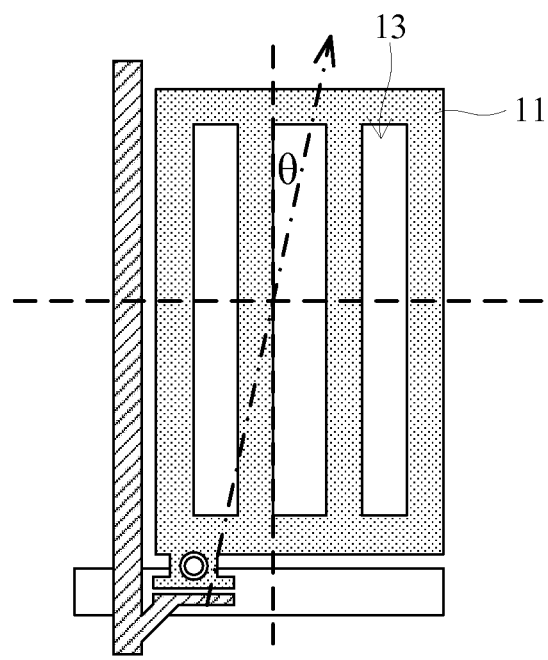
FIGS. 2A and 2B are schematic views of a first irradiation treatment performed on the array substrate according to a manufacturing method of a liquid crystal panel in one embodiment of the present invention, where

Referring to FIG. 2A, in one embodiment of the present invention, when the liquid crystal molecule 41 is a positive liquid crystal, the first pretilt angle has an azimuthal angle θ relative to an extending direction of the slots 13. Preferably, the azimuthal angle is between 0 and 45 degrees.

Figure 2B:
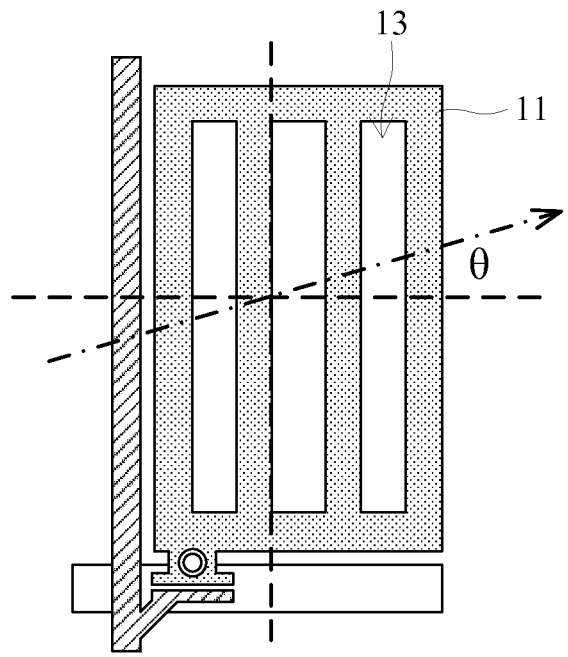

Alternatively, as shown in FIG. 2B, in another embodiment of the present invention, when the liquid crystal molecule 41 is a negative liquid crystal, the first pretilt angle has an azimuthal angle θ relative to a vertical direction of the slots. Preferably, the azimuthal angle is between 0 and 45 degrees.

Figure 3A:
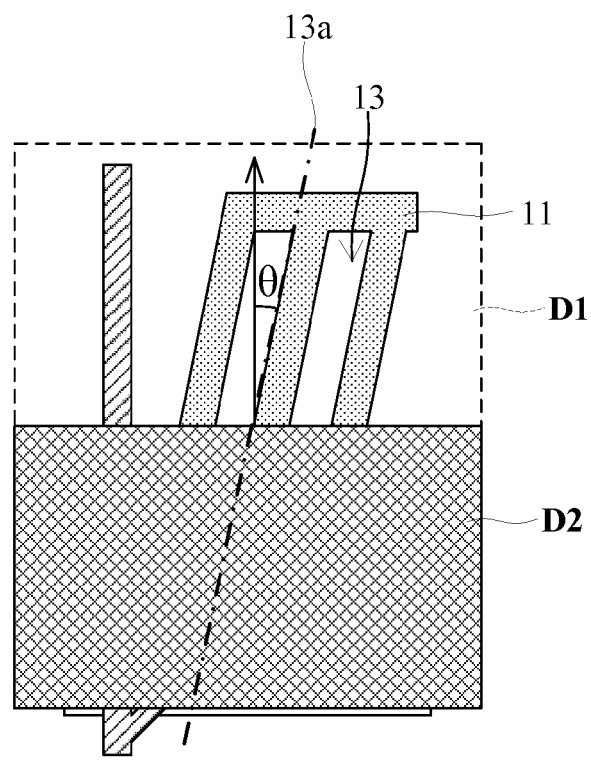
FIGS. 3A and 3B are schematic views of a zoning irradiation performed on the array substrate according to a manufacturing method of a liquid crystal panel in one embodiment of the present invention.
Figure 3B:
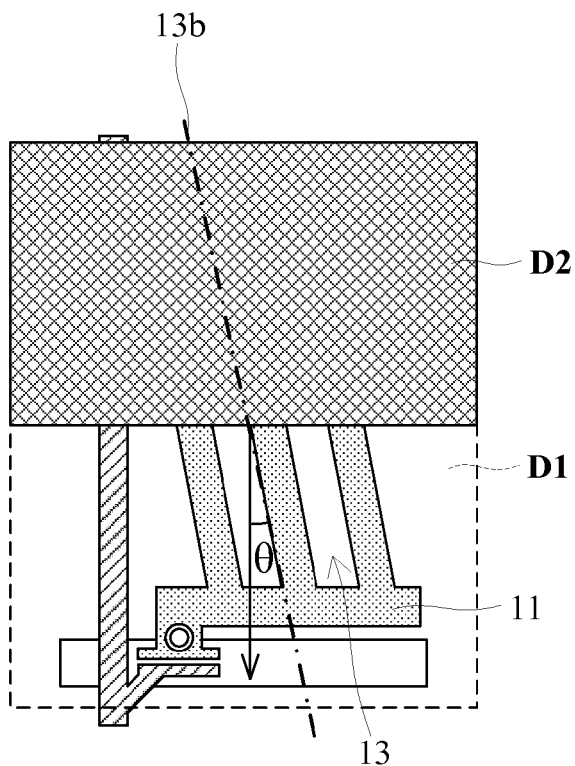

Furthermore, referring to FIGS. 3A and 3B, that are schematic views of the first irradiation treatment performed on the array substrate 10 and the first photo alignment film 31 when the first electrode 11 has different domains according to requirements. A domain D1 and a domain D2 are adjacent each other and correspond to the first electrode 11, the slots 13 generally has two extending directions, such as dotted lines 13a and 13b, and different electric field directions can be formed after conducting the electrodes to drive a longitudinal axis of the liquid crystal molecule to rotate to a desired position. In the manufacturing method of the liquid crystal panel of the present invention, the first treatment can be carried out by a zoning irradiation so that an upper portion corresponding to the domain D1 of the first photo alignment film 31 and a lower portion corresponding to the domain D2 of the first photo alignment film have different pretilt angles respectively, for example, the first pretilt angle is formed at the upper portion and a third pretilt angle is formed at the lower portion.

As shown in FIG. 3A, when performing the zoning irradiation, a lower portion of the array substrate 31 is shaded, only its upper portion is exposed to an UV irradiation, thus the first pretilt angle can be formed. Subsequently, as shown in FIG. 3B, an upper portion of the array substrate 31 is shaded and only its lower portion is exposed to the UV irradiation, thus the third pretilt angle can be obtained.

Similarly, the second irradiation treatment of the step (3) can be carried out by a zoning irradiation so that an upper portion of the second photo alignment film 32 and a lower portion of the second photo alignment film 32 have the second pretilt angle and a fourth pretilt angle respectively. Preferably, the third pretilt angle is antiparallel to the fourth pretilt angle.

As described above, the vertical alignment with low dark-state and quick response with pretilt angles can effectively improve the contrast of IPS/FFS, and obtain a display with high penetration and wide viewing angles. Furthermore, the polymerization of the chemical monomers can be used for increasing the interaction between a liquid crystal and an alignment film to benefit the improvement of image sticking, and further promote the reliability of the liquid crystal panel.

The present invention has been described with preferred embodiments thereof and it is understood that many changes and modifications to the described embodiments can be carried out without departing from the scope and the spirit of the invention that is intended to be limited only by the appended claims.

What is claimed is:

1. A manufacturing method of a liquid crystal panel, comprising steps of:
   providing an array substrate and a color filter substrate, wherein the array substrate comprises a first electrode and a second electrode, and the first electrode has a plurality of slots;
   applying a first photo alignment film to the array substrate, and performing a first irradiation treatment on the first photo alignment film so that the first photo alignment film has a first pretilt angle relative to the array substrate;
   applying a second photo alignment film to the color filter substrate, and performing a second irradiation treatment on the second photo alignment film so that the second photo alignment film has a second pretilt angle relative to the color filter substrate;
   sealing a liquid crystal molecule and a photopolymerizable monomer within a space between the first photo alignment film and the second photo alignment film to form a liquid crystal panel; and
   performing a third irradiation treatment on the liquid crystal panel so as to carry out a polymerization of the photopolymerizable monomer;
   wherein the slots comprise a first extending direction and a second extending direction; the first extending direction and the second extending direction respectively correspond to a first domain and a second domain; and the second pretilt angle is antiparallel to the first pretilt angle; and
   wherein when the liquid crystal molecule is a positive liquid crystal, the first pretilt angle has an azimuthal angle relative to an extending direction of the slots; when the liquid crystal molecule is a negative liquid crystal, the first pretilt angle has an azimuthal angle relative to a vertical direction of the slots.

2. The manufacturing method according to claim 1, wherein, when the liquid crystal molecule is the positive or the negative liquid crystal, the azimuthal angle is between 0 and 45 degrees.

3. The manufacturing method according to claim 1, wherein the first irradiation treatment is carried out by a zoning irradiation so that the first photo alignment film has the first pretilt angle and a third pretilt angle respectively within the first domain and the second domain.

4. The manufacturing method according to claim 3, wherein the second irradiation treatment is carried out by a zoning irradiation so that the second photo alignment film has the second pretilt angle and a fourth pretilt angle respectively within the first domain and the second domain.

5. The manufacturing method according to claim 4, wherein the third pretilt angle is antiparallel to the fourth pretilt angle.

6. The manufacturing method according to claim 1, wherein, after the third irradiation treatment, the manufacturing method further comprises a step of: conducting the first electrode and the second electrode to produce an electric field, so that a longitudinal axis of the liquid crystal molecule rotates to parallel the array substrate and the color filter substrate.

7. A manufacturing method of a liquid crystal panel, comprising steps of:
   providing an array substrate and a color filter substrate, wherein the array substrate comprises a first electrode and a second electrode, and the first electrode has a plurality of slots;
   applying a first photo alignment film to the array substrate, and performing a first irradiation treatment on the first photo alignment film so that the first photo alignment film has a first pretilt angle relative to the array substrate;
   applying a second photo alignment film to the color filter substrate, and performing a second irradiation treatment on the second photo alignment film so that the second photo alignment film has a second pretilt angle relative to the color filter substrate;
   sealing a liquid crystal molecule and a photopolymerizable monomer within a space between the first photo alignment film and the second photo alignment film to form a liquid crystal panel; and
   performing a third irradiation treatment on the liquid crystal panel so as to carry out a polymerization of the photopolymerizable monomer;
   wherein the second pretilt angle is antiparallel to the first pretilt angle.

8. The manufacturing method according to claim 7, wherein, when the liquid crystal molecule is a positive liquid crystal, the first pretilt angle has an azimuthal angle relative to an extending direction of the slots.

9. The manufacturing method according to claim 8, wherein the azimuthal angle is between 0 and 45 degrees.

10. The manufacturing method according to claim 7, wherein, when the liquid crystal molecule is a negative liquid crystal, the first pretilt angle has an azimuthal angle relative to a vertical direction of the slots.

11. The manufacturing method according to claim 10, wherein the azimuthal angle is between 0 and 45 degrees.

12. The manufacturing method according to claim 7, wherein the first irradiation treatment is carried out by a zoning irradiation so that an upper portion of the first photo alignment film and a lower portion of the first photo alignment film have the first pretilt angle and a third pretilt angle relative to the array substrate respectively.

13. The manufacturing method according to claim 12, wherein the second irradiation treatment is carried out by a zoning irradiation so that an upper portion of the second photo alignment film and a lower portion of the second photo alignment film have the second pretilt angle and a fourth pretilt angle relative to the color filter substrate respectively.

14. The manufacturing method according to claim 13, wherein the third pretilt angle is antiparallel to the fourth pretilt angle.

15. The manufacturing method according to claim 7, wherein, after the third irradiation treatment, the manufacturing method further comprises a step of: conducting the first electrode and the second electrode to produce an electric field, so that a longitudinal axis of the liquid crystal molecule rotates to parallel the array substrate and the color filter substrate.

\* \* \* \* \*